AUTOMATIC TRANSMISSION FREQUENCY PREDICATION AND CONTROL SYSTEM

Filed June 7, 1965 2 Sheets-Sheet 1

INVENTOR.
RAYMOND D. EGAN
BY JOHN W. AMES
ATTORNEYS

INVENTOR.
RAYMOND D. EGAN
BY JOHN W. AMES
Flehr and Swain
ATTORNEYS 3,487,312

AUTOMATIC TRANSMISSION FREQUENCY PREDICTION AND CONTROL SYSTEM

Raymond D. Egan, Palo Alto, and John W. Ames, Portola Valley, Calif., assignors to Granger Associates, Palo Alto, Calif., a corporation of California Filed June 7, 1965, Ser. No. 461,812
Int. Cl. H04b 7/02
U.S. Cl. 325—56 9 Claims

ABSTRACT OF THE DISCLOSURE

A teletyped ionogram is processed to yield maximum observed frequency, lowest observed frequency and maximum multipath frequency. Predictions of future frequencies of the above type are made by correlating the long term average of each of such frequencies over a predetermined period of time with the present value of these frequencies. This correlation is weighted to take into account the time of day. By the use of standard deviation of prediction error a future successful optimum frequency of radio transmission is predicted with a predetermined minimum of probability of success.

The present invention relates to an automatic transmission frequency prediction and control system, and more particularly to a system for predicting an optimum frequency of radio transmission and automatically changing a transmission network to this frequency with a minimum of circuit outage.

Good reliability in high frequency communications has long been desired. However, the quality of the transmission on any given frequency wavelength fluctuates over a period of time. This fluctuation is due, in part, to atmospheric disturbances, changes in the ionosphere layers, sun spots and the sequential changing of day into night. Thus, the transmission on any given frequency channel may deteriorate until such channel becomes unuseable, and it is necessary to switch transmission to another channel to maintain continuous communication. Moreover, there is a definite need to provide this change (or QSY), in communications channels, when the presently used channel is still transmitting at tolerable distortion level with a reasonable probability that the new channel to be used will provide the same or better transmission. Furthermore, the change should be made in a minimum time since the transmission network is effectively disabled during the changeover period.

Toward meeting this goal, there has been provided in the past ionosphere sounder systems where the entire high frequency spectrum is scanned and transmission data as to several given frequency channels are obtained indicating the probable quality of the transmission. Such an ionosphere sounder system is discussed in a copending application by Raymond D. Egan, filed Jan. 25, 1965, and entitled "Ionosphere Sounder System," and assigned to the present assignee.

As discussed in that application, the output information supplied by the sounding system gives the radio operator a visual picture showing the maximum observed frequency (MOF), the lowest observed frequency (LOF), and the extent of the multipath transmission which is caused by multiple reflections from the ionosphere. The operator then interprets this data and attempts to predict how long his present frequency will maintain its quality, and to what frequency it will be desirable to switch to next after the present frequency has begun to deteriorate in quality.

This judgment of the operator, of course, is subjective and depends on his individual skill and experience in the field and, as would be expected, a significant loss of transmission time often occurs. For example, the switching from one transmission frequency to another at a transmitter might take on the average of, for example, 10 to 15 minutes. If the operator's selection of the new frequency was inaccurate or in error, then almost the entire process must be gone through again causing another similar lapse in transmission time. Such large losses amount to a large percentage of the information transmission day and thus reduce the efficiency of the transmission link. From another aspect where it is essential that continuity of transmission be maintained, such interrupt time cannot be accepted.

Even in the case of an operator who is very skilled and experienced, the human mind is still limited in its speed and capacity, and thus cannot consider every factor which might affect the transmission quality. Moreover, the manual change of frequencies (OSY) of a communication system is cumbersome and time consuming even when accomplished expeditiously.

It is, therefore, a major purpose of the present invention to provide a frequency predicting system.

It is a major object of the invention to provide an automatic frequency control system for a communications network.

It is yet another object of the invention to provide an automatic frequency control system in which circuit outage time is minimized.

It is still yet another object of the invention to provide an automatic frequency control system which has reduced manpower requirements and enhanced data handling capability.

It is another object of the invention to provide a frequency predicting system which is highly reliable.

It is still another object of the invention to provide a frequency predicting system which yields information as to how long the present transmission frequency will maintain its quality, the other or alternative useable frequency channels, and the estimated time of transmission on the other or alternate useable frequency channels.

It is still another object of the invention to provide a frequency predicting system which yields a frequency of optimum transmission which has a high probability of having the desired transmission quality.

It is still another object of the invention to provide a frequency predicting system which predicts a future operating frequency taking into account data from an ionosphere sounder system, such data including the maximum observed frequency, the lowest observed frequency of transmission, and the minimum multipath frequency.

These and other objects of the invention will become more clearly apparent from the following description.

Referring to the drawings.

Figure 1:
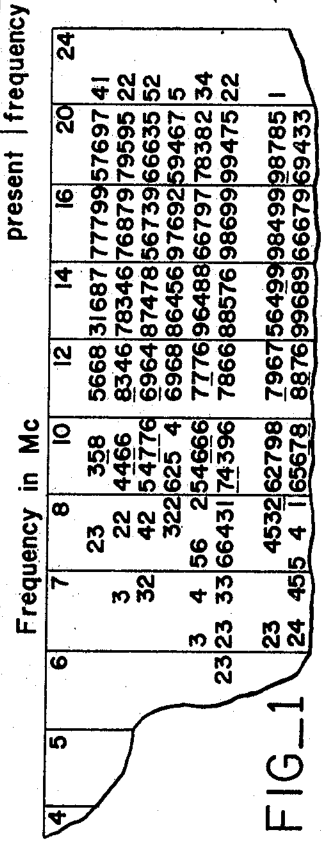
FIGURE 1 is a representation of a portion of the printed output of an ionosphere sounder as described in the copending application referred to above.

There are several different data which are valuable to the communicator in providing him with a basis for predicting the future propagation conditions on his radio transmitting circuit. A Teletype representation of such data is shown in FIGURE 1. This data was obtained by the sounder-receiver disclosed and claimed in the above mentioned patent application entitled "Ionosphere Sounder System."

Briefly, FIGURE 1 is a portion of the output of the sounder-receiver which is produced on a Teletype page printer. As discussed in the above patent application, the horizontal axis of the diagram indicates frequency in megacycles. Within each major frequency division, there are five sub-frequencies represented which are substantially equally spaced, for example, in the case of 10 megacycles, from 9 to 11 megacycles. Each horizontal line depicts a single sounder scan which was taken at one time period, the next or successive horizontal line being taken at, for example, a ten minute interval later. In the portion of the output diagram shown, the first six horizontal lines of numbers indicate an hour, the sounder scanning in ten minute intervals. A line is skipped to indicate the starting of a second hour. The digits themselves on the diagram run from between 1 and 9 and are proportional to the received signal strength on a decibel basis. No digit is recorded if the noise rises above a minimum threshold, the printer skipping a space. The digit which is furthest to the left represents the lowest observed frequency (LOF) and to the right, the maximum observed frequency (MOF). Lastly, multipath distortion in excess of an allowable threshold is indicated by underscoring the digit representing the signal strength. Thus, the maximum multipath frequency (MPF), below which there is excessive multipath distortion, is the next frequency channel above the highest frequency at which there is still a multipath condition indicated by the underlining.

Data of the type shown in FIGURE 1 may be used as an input to the frequency prediction system of the present application for predicting and selecting an optimum frequency of radio transmission. However, other types of inputs may be suitable depending on the specific application of the frequency prediction system. For example, an input of only the maximum observed frequency (MOF) may be suitable.

Assuming the ideal data input, in choosing a frequency channel, it is necessary to pick a frequency below the MOF and above both the MPF and LOF. In addition, other factors must be taken into consideration which are not shown by the ionogram of FIGURE 1 such as a man-made interference (QRM) which the ionogram may not indicate since the assigned communication channels may not be the same as the sounding channels and, in addition, the distortion which may be produced on the channel in operation. This latter factor can only be tested by actually monitoring the assigned frequency during transmission.

Figure 2:
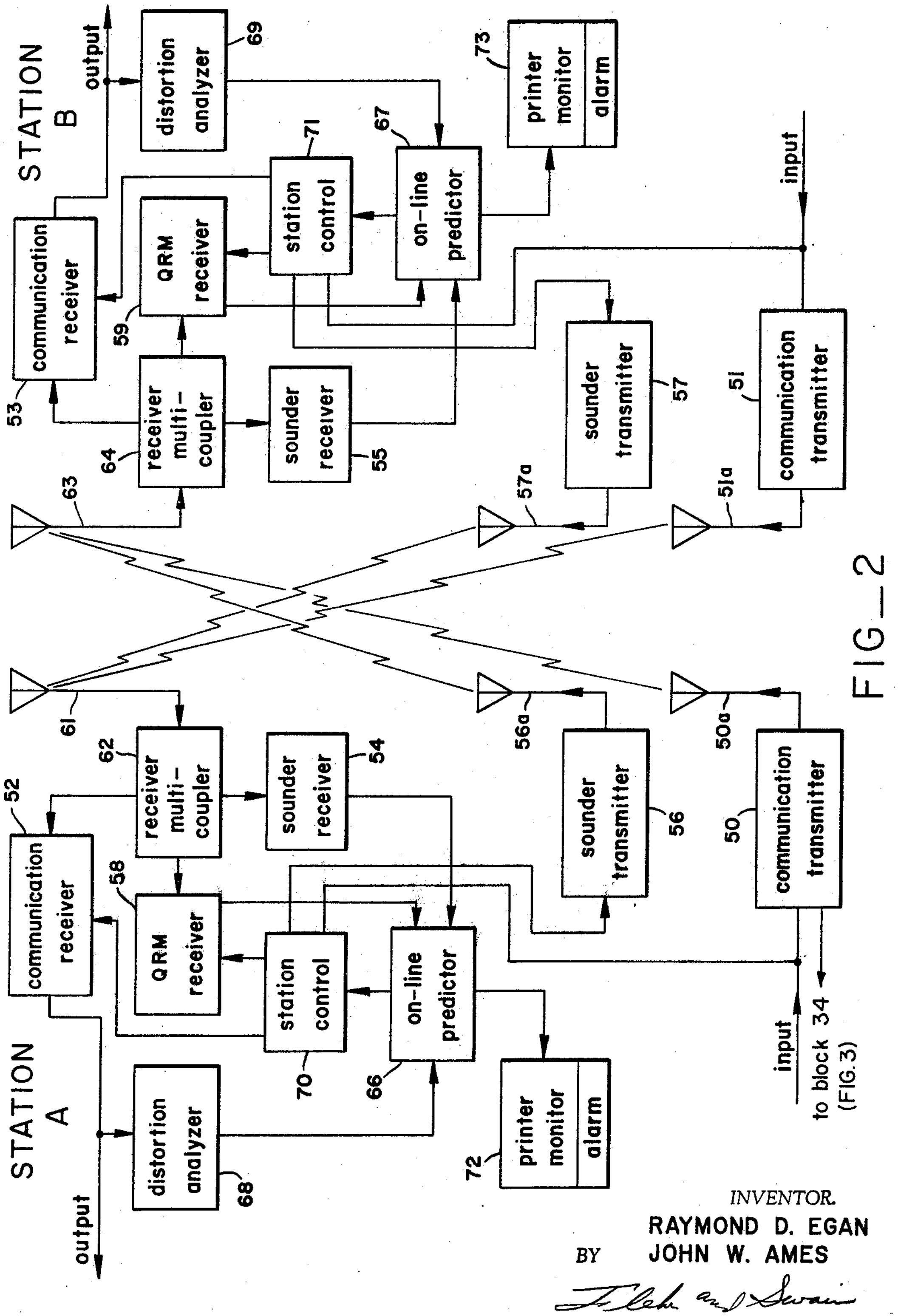
FIGURE 2 is a schematic block diagram embodying the invention.

An over-all automatic frequency change or QSY system providing transmission between two operating stations of a transmission network is shown in FIGURE 2. Stations A and B include communication transmitters 50 and 51, respectively, their associated antennas 50*a* and 51*a*, and communications receivers 52 and 53. In addition, ionosphere sounding equipment is included of the type discussed in the above mentioned patent application and includes in stations A and B, respectively, sounder-receivers 54 and 55 and sounder-transmitters 56 and 57 with their associated transmitting antennas 56*a* and 57*a*. Finally, a third type of receiver for detecting man-made interference on a channel (QRM interference) are receivers 58 and 59.

Communicating receiver 52, QRM receiver 58, and sounder-receiver 54, in the case of station A, are all coupled to a common receiving antenna 61 by a multicoupler 62. Similarly, receivers 53, 55, 59 of station B are coupled to antenna 63 by a multicoupler 64.

An essential part of the automatic frequency selecting system are the on-line predictors 66 and 67 which are coupled to the sounder-receivers, the QRM receivers, and, in addition, to distortion analyzers 68 and 69 which monitor the output from the communication receivers 52 and 53. From a functional point of view, the predictor receives information from the sounder-receivers as to ionosphere characteristics such as propagation and multipath, and, in a manner to be described below, is capable of forecasting propagation for one hour in advance or more. These forecasts are utilized by the predictor in selecting a new operating frequency before it is actually required. This frequency is selected from a pre-programmed list of available circuit channels which have been stored in the predictor. The QRM information from receivers 58 and 59 causes the predictor to select an alternative frequency if interference is present on the first selected channel. This selection of an alternative frequency is, of course, made before any permanent frequency change has been made in the communication transmitter and receiver set up. However, once a change has been made distortion analyzers 68 and 69 monitor the output of the communication receivers and if the distortion is above a certain preset limit, a still second alternative frequency will be chosen and switched to. Similarly, if distortion due to, for example, man-made interference or mulitpath, etc. develops while transmitting on an otherwise satisfactory channel, the distortion analyzer will signal the predictor to select another frequency channel which is more suitable.

The specific frequency change or QSY is accomplished by means of the station control devices 70 and 71 which have as an input the information from the on line predictors and are coupled to the communication receivers, QRM receivers, communication transmitters, and sounder transmitters 56 and 57. Once a frequency change has been indicated by the predictor, the station control causes both the transmitters and receivers to switch to the new frequency selected.

Printer-monitor devices 72 and 73 provide a printed output of the frequencies predicted by the predictors 66 and 67 and, in addition, monitor the prediction to be acted upon by the system. The printer-monitors also include alarms which indicate a malfunction in the system, or a situation where the system cannot function automatically but must be taken over manually; for example, when unusual atmospheric disturbances occur.

The various transmission paths between the transmitter and receivers are indicated by the lightning flash type lines between the various antennas and illustrate that the sounder and communication transmitters 56 and 50 both send to the multi-coupler antenna 63 of station B, and conversely transmitters 51 and 57 of station B are received by antenna 61 of station A.

Figure 3:
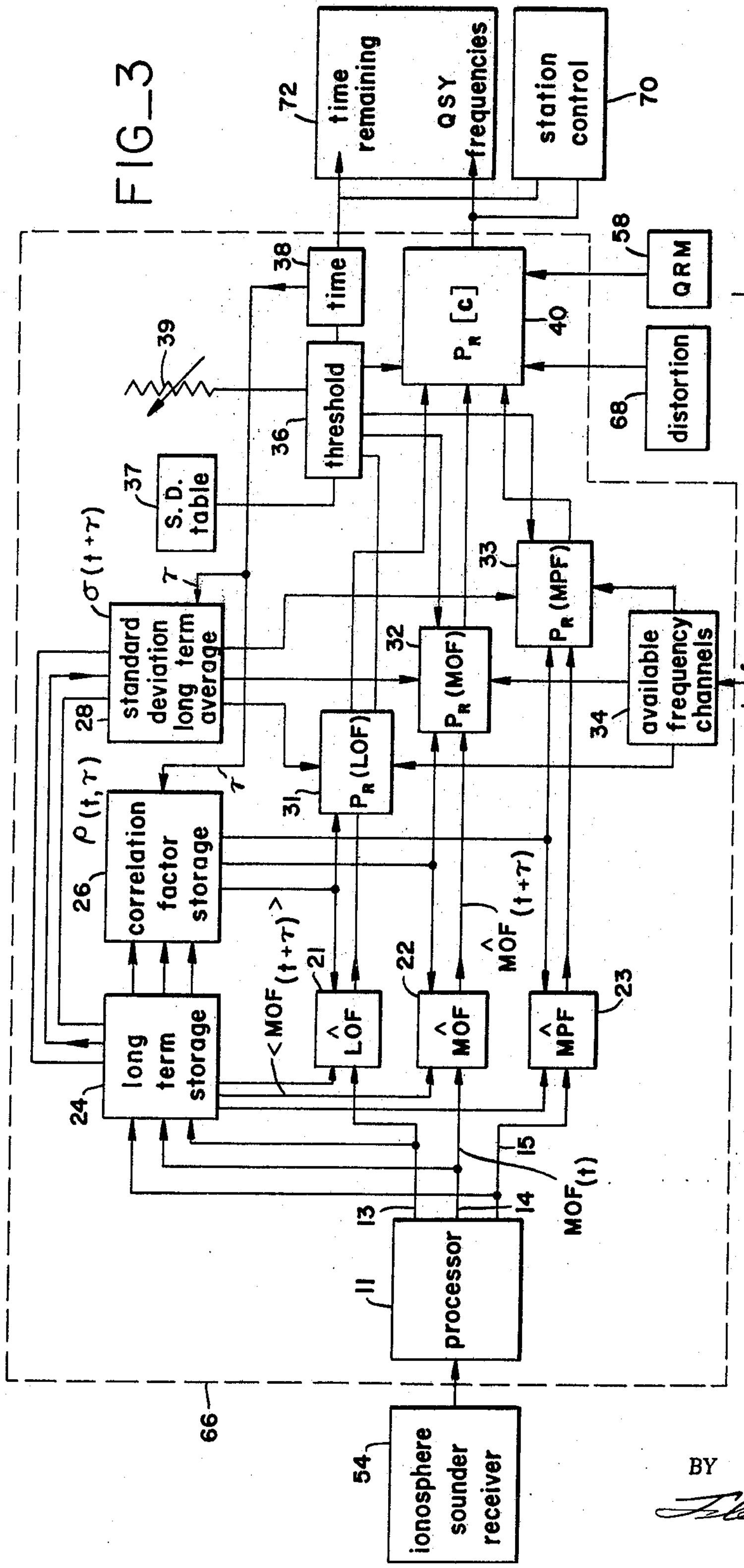
FIGURE 3 is a schematic block diagram showing a portion of FIGURE 2 in greater detail.
Figure 4:
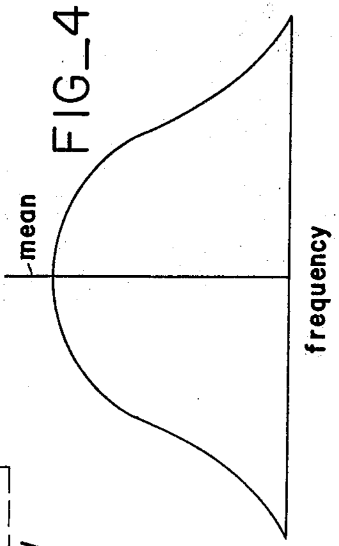
FIGURE 4 is a curve useful in understanding the invention.

The on-line predictors 66 and 67 are one of the major components of the system and FIGURE 3 illlustrates predictor 66 in detail in association with station A. The predictor 66 is shown as a combination of several functional blocks which illustrate its operation and has as inputs information from the ionosphere sounder-receiver 54, distortion analyzer 68, and QRM receiver 58. In addition, it has outputs, as also shown in FIGURE 2, to printer-monitor 72 and station control 70. The functional block diagram of predictor 66 is for purposes of illustration only; in actual practice a computer would perform these functions shown which, of course, would take place in the control unit of the computer as determined by the computer program.

Referring now specifically to the predictor unit 66, the ionosphere sounder receiver provides an input to a processor 11 which processes the Teletype format ionogram information to yield three outputs 13, 14 and 15 including the maximum observed frequency (MOF), the lowest observed frequency (LOF), and the maximum multipath frequency (MPF). This information is fed into the remainder of the predictor which processes it in a manner to be described below. The predictor produces at its output frequency predictions, and the time period for which these frequencies will provide reliable communications. Also responsive to the predictor output is station control means 70 for automatically changing the associated radio receiver-transmitter to the new frequency at the proper time.

Referring now specifically to processor 11, the ionogram of FIGURE 1 must be processed to indicate the three varieties of information, MOF, LOF, and MPF. However, as illustrated in FIGURE 1, the LOF is not merely the extreme left numeral since, for example, in the first line of FIGURE 1, the 2–3 reading in the 8 megacycle column is an isolated reading of low value and actually the 3 of the 3–5–8 reading in the 10 column would be a more accurate representation of the LOF. The same is true for other and later readings. The foregoing also applies to the MOF. Appropriate consideration must also be taken of the effects of different system sensitivities (including antenna patterns). Lastly, the MPF or multipath frequency must also be evaluated from the ionogram; an MPF as, for example, in the seventh line, starting the second hour of ionosphere soundings, in the 20 megacycle column where the first 9 on the right is underlined, would give an erroneous impression of the maximum multipath frequency since it is a rather isolated example. On the other hand, where the multipath readings are clustered together as, for example, in the second line in frequency columns 10 and 12 where the 7–7–6 are underlined, the highest frequency of this group would give a more basic multipath frequency indication. Provision may also be made to interpolate over channels covered by interference which requires an additional noise level input from sounder-receiver 54.

Thus, the processor includes means to interpret the Teletype ionogram or other types of input in order to produce or yield effective information as to MOF, LOF and MPF. This information is further processed by predictor 66 which operates on this information on both a real time basis and a stored time basis.

From an over-all standpoint the predictor operates on the transmission data from processor 11 to provide a frequency prediction having a known or determinable probability of success. This is achieved by the use of certain statistical tools in conjunction with previous sounding data, and the most current reading from the ionosphere sounder 54.

Processor 11, on its outputs 13, 14 and 15, provides current information as to the LOF, MOF and MPF. This information is coupled to frequency predicting devices 21, 22 and 23, and, in addition to a long term storage device 24. The inputs from processor 11 are also coupled to a correlation factor storage 26 which, in combination with long-term storage device 24, both have outputs coupled back into the prediction devices 21, 22 and 23 to supply sufficient information to the prediction devices to make a prediction of an LOF frequency, an MOF frequency, and an MPF frequency for a predetermined future time, designated $t+\tau$, where $t$=present time, and $\tau$=prediction interval. The mathematical method by which prediction devices 21–23 operate on this data is given by the equation $$\hat{MOF}_{(t+\tau)} = \langle MOF_{(t+\tau)} \rangle + [MOF_{(t)} - \langle MOF_{(t)} \rangle] \rho_{(t,\tau)} \quad (1)$$

where:

$\wedge$=predicted value
$\langle\ \rangle$=long-term average
$\rho_{(t,\tau)}$=cross correlation factor of values at time $t$ with values at $t+\tau$ The foregoing equation and all similar equations to follow, it will be understood, are applicable to the MPF and LOF as well as the MOF.

Expressing Equation 1 in words, it stands for the proposition that the predicted MOF frequency at a time in the future $(t+\tau)$ is equal to the long-term average of the MOF frequency at that time of day plus a factor which takes into account the most recent ionosphere sounding MOF($t$) and its difference from the average MOF at that time, and the significance of this difference is weighted by the cross-correlation factor.

Because of the extreme dispersion of sounding data, a mathematical lumped average of all data as, for example, for the past year, would almost be meaningless from a prediction standpoint. However, with a carefully selected type of long-term average in conjunction with a selected correlation factor, a much better prediction can be made.

More particularly, the long-term storage device 24 which serves to store the long-term average of the MOF and, in addition, the LOF and MPF, has a storage term which is less than a month (e.g., ten days). Thus, the amount of variance or dispersion of the values is considerably reduced, and it has been found that prediction based on this time period is much more reliable than, for example, a three-month period. The average value fed to predicting devices 21–23 from storage 24 is the ten day average for that particular time $(t+\tau)$ for which the prediction is desired and is based on the readings taken at a similar time for the ten previous days.

The correlation factor storage 26 also receives information from processor 11 to be used in arriving at a correlation factor for a particular time $(t+\tau)$. As opposed to the long-term storage which is updated daily, the cross-correlation factor may have to be updated perhaps only every thirty days. In essence, what the cross-correlation factor indicates is what weight should be given to the presently measured difference in the actual MOF from the average MOF for use in a future prediction; in other words, if the correlation of the MOF data between times separated by $\tau$ is quite small, the significance of the pre-existing difference between the average and actual MOF will have little bearing far into the future and thus the weight of this difference is quickly diminished into the future time period by the cross-correlation factor. In a case of this type, this means that the predicted MOF after, for example, an hour, will be very close to the average MOF, the pre-existing difference not being of any significance at this time. Conversely, a high correlation factor means that current measurements can be weighted heavily in making a prediction. Thus, the correlation factor initially at time ($t$), has a value of one, but decreases in time towards zero. Again, as in the case of the long-term average, the correlation factor may be chosen to take into account additional variables whereby the accuracy of the prediction for a predetermined length of time into the future may be improved. Towards achieving this objective, correlation factor storage 26 takes into account the time of day at which the prediction is being made and supplies a particular correlation factor for this time. This has the result of making predictions which occur during, for example, 10:00 a.m. to 12:00 a.m. in the morning where there is little change in the ionosphere, much more accurate since the correlation factor will be quite high. On the other hand, during times of extreme change in ionosphere conditions, such as from day into evening, the correlation factor will take this change into account to give a realistic appraisal of the transmission system.

However, the prediction of the MOF, LOF and MPF by devices 21–23 by itself is not sufficient to provide a good frequency prediction. The predicted information must be further processed in order to increase its usefulness.

Means are provided in processing the predicted maximum observed frequency along with the predicted lowest observed frequency and predicted maximum multipath frequency for finding the standard deviation of the prediction error by taking into account the standard deviation of the long term measurements and the correlation factors. Such means include a unit 28 which is coupled to the long term storage 24 and provides a measure of the deviation or dispersion of the sounder measurements for a given time of the day. Such information, in conjunction with the correlation factor, provides information as to the standard deviation or dispersion of the error made in the previous step of predicting the LOF, MOF and MPF in devices 21–23. From a mathematical point of view, the standard deviation of the prediction error is $$\sigma_p=\sigma_{(t+\tau)}\sqrt{1-\rho^2{}_{(t+\tau)}} \quad (2)$$

where $\sigma_{(t+\tau)}$ is equal to the standard deviation of measurements at $t+\tau$ making up the long term average which is the information contained in standard deviation unit 28. The $p$ in $\sigma_p$ indicates that $\sigma$ is the standard deviation of a prediction error. Actual values will be $\sigma_{MOF}$, $\sigma_{LOF}$ and $\sigma_{MPF}$ for the three quantities of interest.

Equation 2 is performed in probability units 31, 32 and 33 which are all coupled to standard deviation unit 28 and the prediction devices 21–23. The probability devices 31–33 also have an input from a storage device 34 which contains the authorized or available frequency channels on which the radio transmission system in question may transmit. Although the frequency predicting system has the capability of predicting the optimum frequency, the actual authorized channel must, in the final analysis, be used and thus a compromise must be made in this respect. The probability units, using the standard deviation of the prediction error and the available authorized frequencies, produce several frequency predictions which will have a calculated probability of success.

Equations 3*a*, 3*b* and 3*c* indicate the operation of these probability units and are as follows:

$$P_R[f>MOF]=1-\phi\frac{(\hat{MOF}-f)}{(\sigma_{MOF})} \quad (3a)$$

$$P_R[f<MPF]=1-\phi\frac{(f-\hat{MPF})}{(\sigma_{MPF})} \quad (3b)$$

$$P_R[f<LOF]=1-\phi\frac{(f-\hat{LOF})}{(\sigma_{LOF})} \quad (3c)$$

where the three equations illustrate symbolically the use of $\sigma_{MOF,\ MPF,\ LOF}$ (the standard deviation of the prediction error, $\sigma_p$ for each quantity MOF, MPF and LOF) in predicting the probability of an available or authorized frequency $f$ being greater than the MOF and below the MPF or LOF. The function represented by $\phi$ ( ) is contained in standard deviation table 37 which is used to convert the standard deviation to a percentage probability figure. In actual practice, the MOF is always used and either the LOF or MPF are alternatively used; that is, if no MPF exists, then the corresponding LOF probability is used.

Referring now specifically to Equation 3*a*, it is obvious from inspection that if the authorized frequency $f$ is equal to the predicted MOF, the term within the parenthesis will be zero. From a graphical standpoint as illustrated in FIGURE 3, this means that the actual frequency lies on the mean or central line of the normal bell-shaped probability curve, and thus there is a fifty percent probability that the frequency will be less than the means or less than the MOF and a fifty percent probability that it will be more. On the other hand, if the chosen frequency is very conservative (that is, much lower than the predicted MOF), the probability that this frequency will be below the MOF will be very large; for example, with a mathematical ratio of 2 within the brackets in Equation 3*a* the probability that the frequency in question will be below the MOF is 98%. Of course, with this conservative ratio, there might be greater danger of being below the MPF or LOF.

The probabilities represented by Equations 3*a*, 3*b* and 3*c* and as computed in units 31–33, are also dependent on the time of the prediction into the future; in other words, for very short period prediction of perhaps 10 to 20 minutes, a high probability percentage may be easily obtained.

In accordance with the invention, means for predicting a frequency that will have a reasonable probability of success in communicating at a predetermined future time includes a threshold device 36 which is coupled to a standard deviation table 37 and a timing device 38.

Threshold device 36 has an external variable input 39 which may be preset to any desired probability of communication percentage. This value is dependent on the intended use of the communication channels and the prediction time desired.

The individual probability computations from unts 31–33 are combined in an over-all probability unit 40 which is also coupled to threshold device 36. Probability unit 40 performs the equation $$P_R[c]=1-P_R[f>MOF]-P_R[f<MPF]+P_R[f>MOF]P_R[f<MPF] \quad (4)$$

where $P_R[c]$ is the over-all probability of success of communication.

Again, as discussed previously, if no MPF exists, the corresponding LOF figure will be used.

In operation, after the threshold percentage is set into device 36, the predictor will digitally test varying times from time unit 38 along with varying available frequencies from frequency storage 34 and produce from probability unit 40 the following quantities:

(1) Time remaining for satisfactory communication on the present frequency.
(2) Estimated time at which a QSY must be made.
(3) The frequency to which the QSY of (2) must be made.
(4) An alternative frequency to which to QSY immediately if communication should fail unexpectedly on the present frequency as, for example, as a result of interference from another station.

These outputs, time remaining and QSY frequencies, may be relayed to the operator by monitor 72 and also directly coupled into station control 70 of the automatic QSY system which will switch the over-all communication system to the new frequency. However, when this automatic shift of transmission is utilized, it is conditioned to operate only when the present frequency has a relatively short time remaining for reliable transmission.

In some applications it may be feasible to use only the MOF data for frequency prediction where the LOF and MPF are not critical.

Thus, the present invention has provided a frequency prediction system which effectively eliminates the human operator and his attendant errors and limitations, and gives an exact indication of the probability of successful future transmission, indicates the time remaining for transmission on the presently used frequency channel, and provides for an automatic change to a new frequency to thereby minimize the network outage time and to significantly improve its data handling capability.

We claim:

1. A frequency prediction system for selecting an optimum frequency of radio transmission for a future time comprising: means responsive to information from an ionosphere sounder system for predicting a maximum observed frequency for said future time by correlating the long term average of such frequency over a predetermined previous time period less than thirty days with the present maximum observed frequency, such correlation being weighted to take into account the time of day; means for processing said predicted maximum observed frequency including means for finding the standard deviation of the prediction error for the predicted maximum observed frequency by taking into account the standard deviation of long term measurements of the maximum observed frequency and, in addition, said correlation factor; and means for computing from said standard deviation of said prediction error at least one frequency that will be less than the predicted maximum observed frequency for said future time with a predetermined minimum probability of success.

2. In a frequency prediction system for selecting an optimum frequency of radio transmission for a future time comprising: means responsive to information from an ionosphere sounder system for predicting a maximum observed frequency, a lowest observed frequency, and a maximum multipath frequency for said future time by correlating the long term average of each of such frequencies over a predetermined previous time period with the present values of such frequencies, such correlation being weighted to take into account the time of day; means for processing said predicted frequencies including means for finding the standard deviation of the prediction error for such frequencies by taking into account the standard deviation of long term measurements of such frequencies and, in addition, said correlation factor; and means for computing from said standard deviation of said prediction error at least one frequency that will be less than the predicted maximum observed frequency and greater than said predicted lowest observed frequency and maximum multipath frequency for said future time with a predetermined minimum probability of success.

3. A frequency prediction system for selecting an optimum frequency of radio transmission for a future time comprising: means responsive to information relating to the electromagnetic transmission characteristics of the ionosphere for predicting a maximum observed frequency for said future time by correlating the long term average of such maximum observed frequency over a predetermined previous time period less than thirty days with the present maximum observed frequency, such correlation being weighted to take into account the time of day; means for processing said predicted maximum observed frequency including means for finding the standard deviation of the prediction error for the predicted maximum observed frequency by taking into account the standard deviation of long term measurements of the maximum observed frequency and, in addition, said correlation factor; and means for computing from said standard deviation of said prediction error at least one frequency that will be less than the predicted maximum observed frequency for said future time with a predetermined minimum probability of success.

4. A frequency prediction system as in claim 3 which includes means for processing said ionosphere information to eliminate random interference bits.

5. A frequency system as in claim 1 including means responsive to said computing means for automatically switching the frequency of radio transmission of an operating transmitter to said one frequency.

6. An automatic system for changing the frequency of operation of a commuications network in response to a change in transmission conditions comprising: predictor means for processing information from an ionosphere sounder-receiver for predicting a first frequency of optimum transmission and an alternate frequency of optimum transmission with determinable probabilities of successful communication; means for evaluating interference on said predicted frequency channels; a communications transmitter and receiver, having a plurality of communication frequency channels which are selectively available, coupled and responsive to said predictor means to automatically change to one of said predicted frequencies; distortion monitoring means for detecting the distortion level on said predicted first frequency; control means coupled to said predictor means and responsive to said interference evaluating means and said distortion detecting means for automatically changing said transmitter and received to said alternate frequency of optimum transmission if either said interference or distortion is above a predetermined level.

7. A frequency prediction system for selecting from a group of available operating frequencies an optimum frequency of radio transmission for a future time comprising: means responsive to information from an ionosphere sounder system for predicting a maximum observed frequency for said future time by correlating the long term average of such frequency over a predetermined previous time period less than thirty days with the present maximum observed frequency, such correlation being weighted to take into account the time of day; means for processing said predicted maximum observed frequency including means for finding the standard deviation of the prediction error for the predicted maximum observed frequency by taking into account the standard deviation of long term measurements of the maximum observed frequency and, in addition, said correlation factor; means for computing from said standard deviation of said predicted error a plurality of said available frequencies which will be less than the predicted maximum observed frequency with at least a predetermined minimum probability of success; means for determining the respective times for which said plurality of frequencies will provide successful communication with at least said minimum probability of success; and means responsive to said time determination for selecting available operating frequencies to be used.

8. An automatic system for changing the frequency of operation of a communications network in response to a change in transmission conditions comprising predictor means for processing information from a receiver and predicting a frequency of optimum transmission and an alternate frequency of transmission said predictor means comprising means responsive to an ionosphere sounder-receiver for predicting a maximum observed frequency for a future time by correlating the long term average of such frequency over a predetermined previous time period less than thirty days with the present maximum observed frequency, such correlation being weighted to take into account the time of day, means for processing said predicted maximum observed frequency including means for finding the standard deviation of the prediction error for the predicted maximum observed frequency by taking into account the standard deviation of long term measurements of the maximum observed frequency and, in addition, said correlation factor, means for computing from said standard deviation of said prediction error at least one frequency that will be less than the predicted maximum observed frequency for said future time with a predetermined minimum probability of success; and a communications transmitter having a plurality of communication frequency channels which are selectively available coupled and responsive to said predictor means to automatically change from said optimum frequency of transmission to said alternate frequency of transmission in response to information received from the predictor.

9. An automatic system for changing the frequency of operation of a communications network in response to a change in transmission conditions comprising predictor means for processing information from a receiver and predicting a frequency of optimum transmission and an alternate frequency of transmission said predictor means comprising means responsive to information from an ionosphere sounder system for predicting a maximum observed frequency, a lowest observed frequency, and a maximum multipath frequency for a future time by correlating the long term average of each of such frequencies over a predetermined previous time period with the present value of such frequencies, such correlation being weighted to take into account the time of day, means for processing said predicted frequencies including means for finding the standard deviation of the prediction error for such frequencies by taking into account the standard deviation of long term measurements of such frequencies and, in addition, said correlation factor, means for computing from said standard deviation of said prediction error at least one frequency that will be less than the predicted maximum observed frequency and greater than said predicted lowest observed frequency and maximum multipath frequency for said future time with a predetermined minimum probability of success; and a communications transmitter having a plurality of communication frequency channels which are selectively available coupled and responsive to said predictor means to automatically change from said optimum frequency of transmission to said alternate frequency of transmission in response to information received from the predictor.

References Cited

UNITED STATES PATENTS

| | | | |
|---|---|---|---|
| 2,521,696 | 9/1950 | De Armond | 325—51 |
| 2,694,140 | 11/1954 | Gilman et al. | 343—177 |
| 2,892,930 | 6/1959 | Magnuski et al. | 325—56 X |
| 3,123,773 | 3/1964 | Vogelman | 325—67 |

OTHER REFERENCES

Institute of Radio Engineers, PROCEEDINGS: vol. 47, No. 2; February 1959, pp. 323–327, Shapley, A. H., "The Day to Day Coordination of IGY Observations."

ROBERT L. GRIFFIN, Primary Examiner

B. V. SAFOUREK, Assistant Examiner

U.S. Cl. X.R.

325—67; 343—175